(12) United States Patent
Hofer

(10) Patent No.: US 8,555,815 B2
(45) Date of Patent: Oct. 15, 2013

(54) LIVESTOCK FEEDER

(76) Inventor: James G. Hofer, Lethbridge (CA)

( * ) Notice: Subject to any disclaimer, the term of this patent is extended or adjusted under 35 U.S.C. 154(b) by 244 days.

(21) Appl. No.: 12/982,955

(22) Filed: Dec. 31, 2010

(65) Prior Publication Data

US 2012/0000429 A1    Jan. 5, 2012

Related U.S. Application Data

(60) Provisional application No. 61/292,211, filed on Jan. 5, 2010.

(51) Int. Cl.
*A01K 5/00* (2006.01)

(52) U.S. Cl.
USPC ................................. 119/60; 119/58

(58) Field of Classification Search
USPC ............... 119/52.1, 58–60; D30/108–109, D30/113–114, 131, 121
See application file for complete search history.

(56) References Cited

U.S. PATENT DOCUMENTS

| | | | |
|---|---|---|---|
| 387,892 A | | 8/1888 | Light |
| 390,259 A | * | 10/1888 | Sohwartz ........................ 119/58 |
| 872,032 A | * | 11/1907 | Tolle ................................ 119/58 |
| 1,347,070 A | | 7/1920 | York |
| 2,827,876 A | | 3/1958 | Trobaugh |
| 3,249,090 A | * | 5/1966 | Ripley ......................... 119/52.1 |
| 3,265,227 A | * | 8/1966 | Vratil et al. .................... 414/526 |
| 3,782,333 A | | 1/1974 | Feterl |
| 3,906,901 A | | 9/1975 | Cox |
| 3,999,520 A | * | 12/1976 | Feterl ............................... 119/58 |
| 4,020,794 A | * | 5/1977 | Nethery ........................... 119/58 |
| 4,078,523 A | | 3/1978 | Etzler |
| 4,258,663 A | * | 3/1981 | Schoessow ...................... 119/58 |
| 5,092,273 A | * | 3/1992 | Meyer ........................... 119/52.4 |
| 5,158,040 A | * | 10/1992 | Martin ............................. 119/58 |
| 5,237,962 A | * | 8/1993 | Garman ........................... 119/58 |
| 5,311,840 A | | 5/1994 | Rumbaugh |
| 5,337,699 A | * | 8/1994 | Dyson ............................. 119/60 |
| 5,386,800 A | * | 2/1995 | Pirok ............................... 119/58 |
| 5,477,811 A | * | 12/1995 | Nobles et al. .................... 119/60 |
| 5,582,131 A | | 12/1996 | Curtis |
| 5,743,211 A | * | 4/1998 | Schoessow ...................... 119/58 |
| 6,213,053 B1 | * | 4/2001 | Lammers ................... 119/51.01 |
| D451,649 S | * | 12/2001 | Lovell .......................... D30/131 |
| 6,691,642 B2 | * | 2/2004 | Dollahan ......................... 119/58 |
| 6,951,189 B1 | | 10/2005 | Lienemann |
| 7,073,460 B1 | * | 7/2006 | Rasmussen et al. ............. 119/60 |
| 2010/0263597 A1 | * | 10/2010 | Kerns .............................. 119/60 |

* cited by examiner

*Primary Examiner* — Rob Swiatek
*Assistant Examiner* — Justin Benedik
(74) *Attorney, Agent, or Firm* — Ryan W. Dupuis; Kyle R. Satlerthwaite; Ade & Company Inc.

(57) ABSTRACT

A livestock feeder receiving one or more large bales therein includes a base, a bunk wall extending upwardly from the base to surround a lower bunk area, a hopper wall spaced above the bunk wall to surround an upper hopper area while allowing the large bale to fall through to the lower bunk area. The bottom end of the hopper wall is spaced upwardly and inwardly in relation to the top end of the bunk wall therebelow to allow access of the head of feeding livestock therebetween. The feeder construction permits bales to be readily centered within the bunk area by the hopper for even feeding access by animals about the perimeter. Also by allowing the bales to fall through the hopper, the bales can be fully recessed below the height of the hopper wall for protection from wind erosion.

16 Claims, 3 Drawing Sheets

LIVESTOCK FEEDER

This application claims the benefit under 35 U.S.C. 119(e) of U.S. provisional application Ser. No. 61/292,211, filed Jan. 5, 2010.

FIELD OF THE INVENTION

The present invention relates to a livestock feeder arranged to receive one or more large bales therein such that livestock can access the bales for feeding, and more particularly the present invention relates to a livestock feeder comprising a lower bunk area locating the bales therein for access by the livestock for feeding and an upper hopper area above the lower bunk area through which the bales are received.

BACKGROUND

It is common practice when feeding bales to animals to place the bale in a feeder comprising a frame which surrounds the bale in an attempt to minimize waste of feed from the bale by forcing the animals to feed at the feeder location rather than spreading the feed about on the ground. A typical feeder construction comprises an open frame which can result in waste of feed material simply by wind blowing feed off of the bale onto the ground surrounding the feeder.

Some feeders comprise a lower bunk area comprising a perimeter wall overtop of which the animal reaches to feed. Typical constructions involving a lower bunk area however comprise an open frame supporting the bale thereabove such that it is more common for the animals to pull the feed directly from the bale suspended above the bunk so that the feed is again spread about the ground externally of the feeder causing considerable waste.

In yet further designs the frame centrally locates the bale relative to the surrounding bunk wall which includes a plurality of feeding stations spaced thereabout. Prior art designs generally either position the bunk wall too close or too far from the central location where the bale is supported. When the bunk wall is too close to the bale supporting area, the animals tend to pull the feed externally of the feeder such that considerable feed is wasted on the ground. When the bunk wall is positioned too far from the central bale location, the animals typically cannot reach the central area of the feeder so that feed is again wasted internally within the feeder.

SUMMARY OF THE INVENTION

According to one aspect of the invention there is provided a livestock feeder arranged for use with a large bale, the feeder comprising:

a base arranged to be supported on the ground;

a bunk wall extending upwardly from the base about a perimeter of the base from a bottom end to a top end thereof so as to surround a lower bunk area;

a hopper wall extending about a perimeter of the base spaced above the bunk wall to surround an upper hopper area above the lower bunk area, the hopper wall extending upwardly at an outward inclination from a bottom end to a top end thereof; and a plurality of support members spanning between the hopper wall and the bunk wall at horizontally spaced positions along the walls;

the bottom end of the hopper wall being spaced upwardly and inwardly in relation to the top end of the bunk wall therebelow about the perimeter of the base;

the hopper wall being positioned such that a minimum cross sectional dimension of the hopper area at the bottom end of the hopper wall is arranged to receive the large bale therethrough from the upper hopper area to the lower bunk area therebelow.

By providing a combination of a bunk wall with a hopper thereabove which permits the bale to pass therethrough into the lower bunk area, a resulting feeder construction permits bales to be readily centered within the bunk area by the hopper thereabove for even access by animals about the perimeter to the central location of the bale. Furthermore by allowing the bales to fall through the hopper, the bales can be fully recessed below the height of the hopper wall for protection from wind erosion to yet further minimize waste. By appropriately spacing the bottom end of the hopper wall to be upward and inward from the top end of the bunk wall, an optimal spacing can be provided between the bunk wall and the hopper wall to encourage animals to feed from a central portion of the feeder below the hopper. By encouraging the animals to reach beneath the hopper, the animals are less likely to pull feed out of the hopper so that no material is wasted on the ground externally of the hopper.

The minimum cross sectional dimension of the hopper area is preferably at least 72 inches.

Preferably the top end of the hopper wall is spaced above the base so as to be arranged to be near in height to or greater in height than the large bale.

The bottom end of the hopper wall is preferably spaced from the top end of the bunk wall so as to be arranged to receive a head of a livestock animal therethrough. More particularly the bottom end of the hopper wall may be spaced inwardly from the top end of the bunk wall by a horizontal distance comprising 12 to 18 inches, or more preferably approximately 15 inches. Furthermore, the bottom end of the hopper wall may be spaced inwardly from the top end of the bunk wall by a horizontal distance which is approximately equal to a vertical distance between the bottom end of the hopper wall and the top end of the bunk wall.

The bottom end of the hopper wall may be approximately 36 to 40 inches in height while the top end of the bunk wall may be approximately 22 to 26 inches in height. Accordingly, the bottom end of the hopper wall is preferably spaced upwardly from the top end of the bunk wall by a vertical distance comprising 12 to 16 inches.

The top end of the hopper wall may be in vertical alignment with the top end of the bunk wall.

When the perimeter of the base is rectangular in shape comprising two opposed long sides and two opposed short sides; preferably the cross sectional dimension of the hopper area at the bottom end of the hopper wall between the two opposed long sides is arranged to be approximately equal to a cross section dimension of the large bale. Also, the cross sectional dimension of the hopper area at the bottom end of the hopper wall between the two opposed short sides is preferably arranged to be approximately equal to a cross section dimension of a plurality of large bales in series with one another.

There may be provided a plurality of posts extending upwardly from the base to the top end of the hopper wall in which the hopper wall and the bunk wall are supported on the posts.

When the support members are connected between the top end of the bunk wall and the bottom end of the hopper wall, preferably the support members are spaced apart so as to be arranged to receive a head of a livestock animal therebetween.

Each of the support members may comprise a first portion extending generally inwardly from the top end of the bunk wall and a second portion extending generally upwardly from the first portion to the bottom end of the hopper wall in which the first portion extends downwardly beyond the top end of the bunk wall.

Each of the support members may further comprise a first portion extending generally inwardly from the top end of the bunk wall and a second portion extending generally upwardly from the first portion to the bottom end of the hopper wall in which the second portion extends inwardly beyond the bottom end of the hopper wall.

A horizontal distance between the bottom ends of the hopper wall at a pair of opposing sides of the base is preferably arranged to be greater than the large bale while a horizontal distance between the second portions of the support members at the pair of opposing sides of the base is preferably arranged to be less than the large bale.

When the perimeter of the base is rectangular in shape comprising two opposed long sides and two opposed short sides, the support members are preferably joined between the bottom end of the hopper wall and the top end of the bunk wall at spaced apart positions along each of the long sides and each of the short sides.

Also when the base is rectangular in shape comprising two opposed long sides and two opposed short sides, the base preferably comprises two elongate rails extending along the long sides while the bunk area is open to the ground between the two elongate rails of the base.

The bottom end of the bunk walls at the short sides of the base are preferably spaced upwardly from the two elongate rails to define an opening therebelow.

One embodiment of the invention will now be described in conjunction with the accompanying drawings in which:

DETAILED DESCRIPTION

Figure 1:
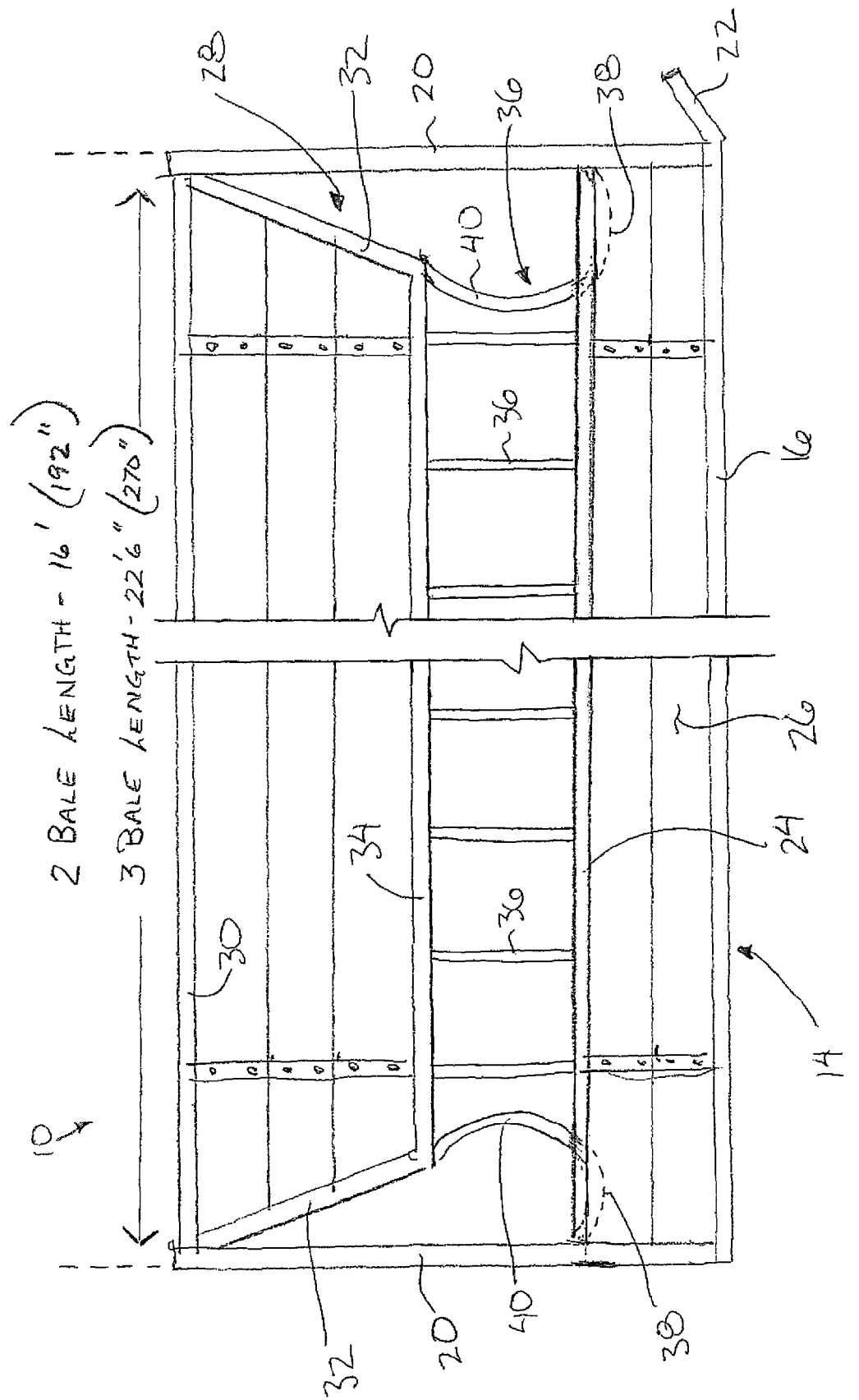
FIG. 1 is a side elevational view of the livestock feeder.
Figure 2:
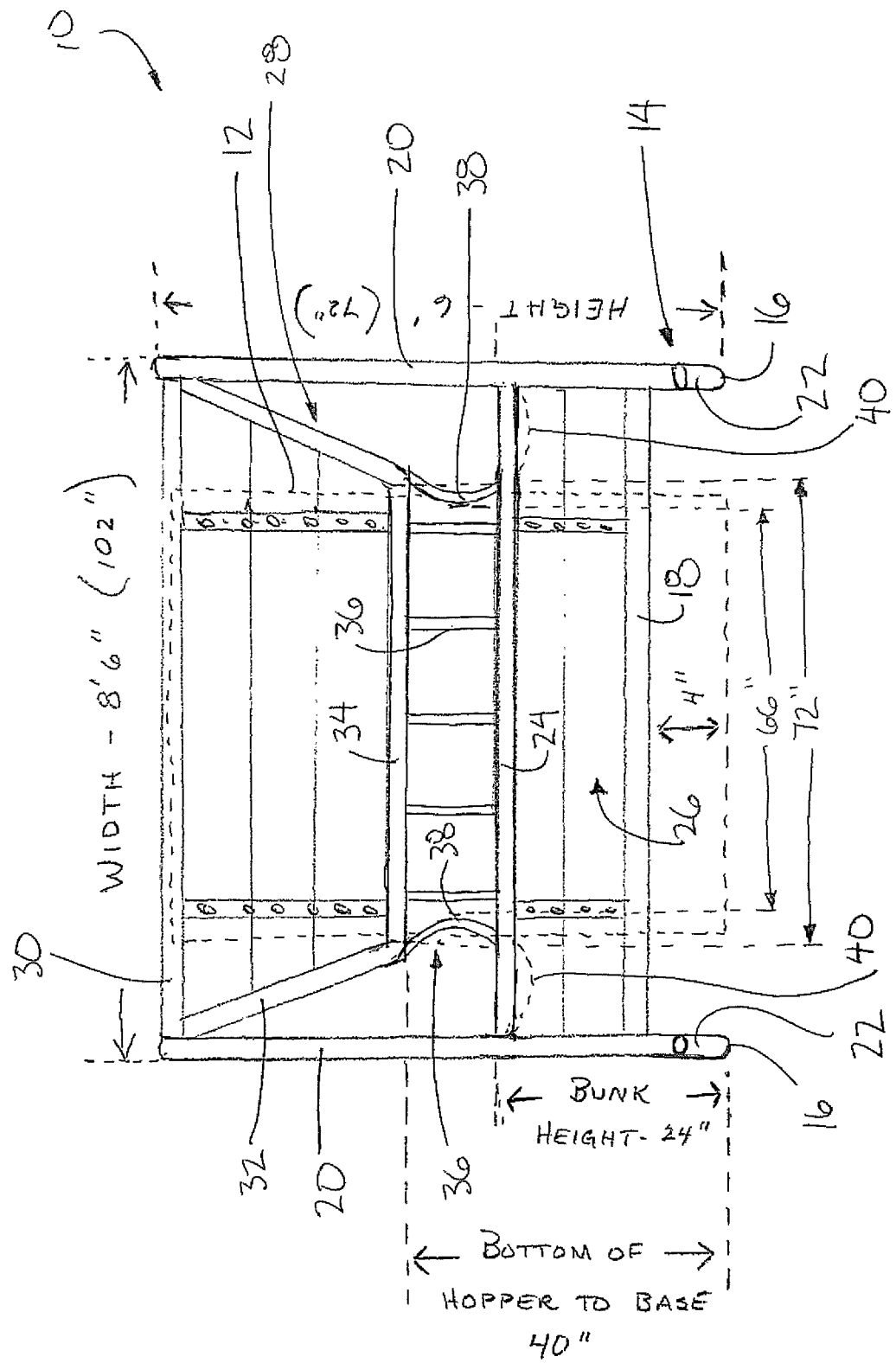
FIG. 2 is an end elevational view of the feeder.
Figure 3:
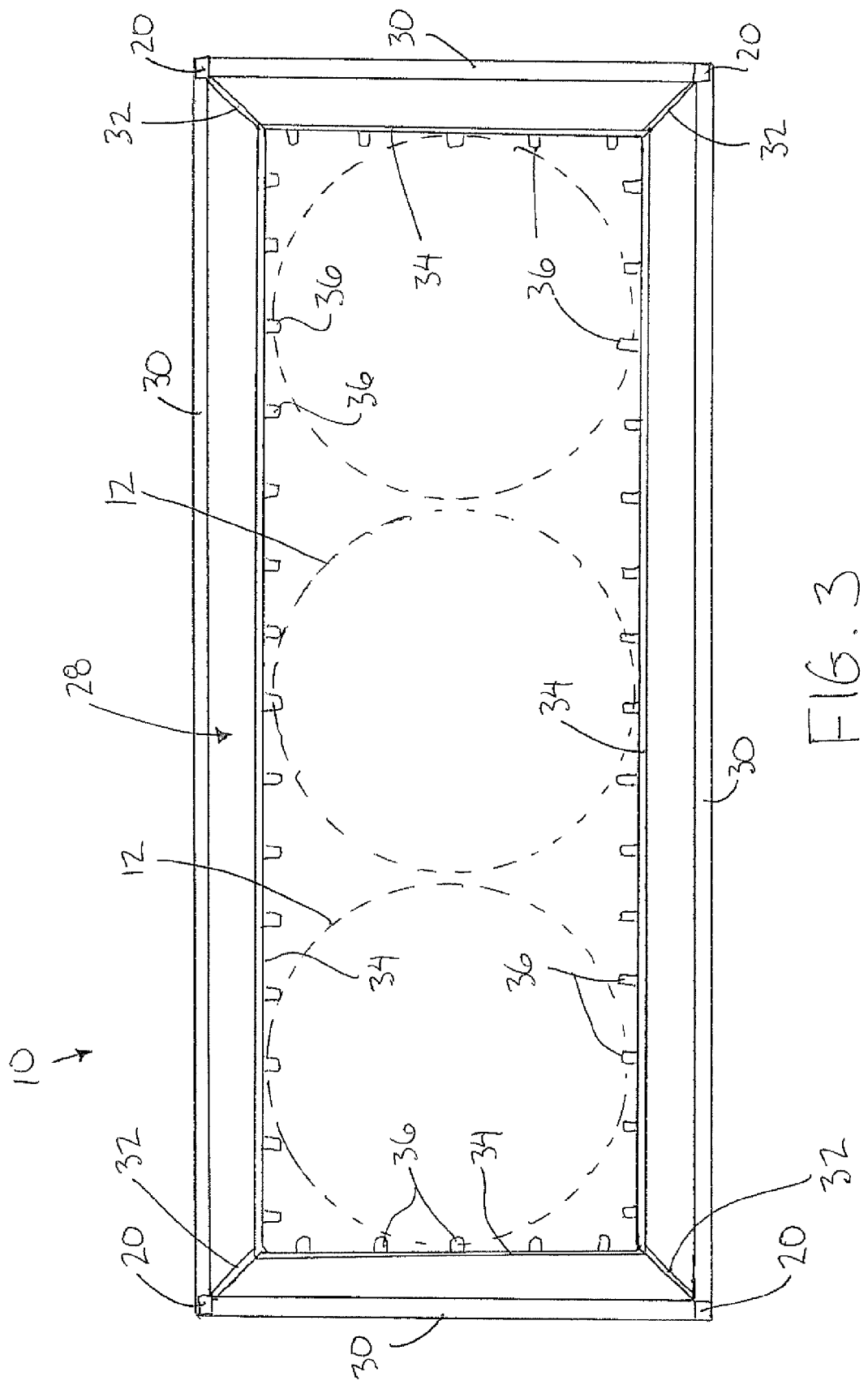
FIG. 3 is a top plan view of the feeder.
In the drawings like characters of reference indicate corresponding parts in the different figures.

Referring to the accompanying figures there is illustrated a livestock feeder generally indicated by reference numeral 10. The feeder 10 is typically arranged to received two or three large bales 12, for example large round bales having a diameter near 72 inches and a height in the axial direction which is also near 72 inches or similar dimensioned large square bales.

The feeder 10 is typically arranged to be slidable along the ground in a longitudinal direction thereof by towing by a suitable tractor so as to be positioned within a pasture or feeding area for livestock, for example cattle.

The feeder generally comprises a frame assembled from rigid frame members which includes a base 14 having a generally rectangular perimeter. The base 14 comprises two elongate rails 16 extending along two opposed long sides of the perimeter base and two crossbars 18 connected between opposing ends of the rails 16 along the two opposing short sides of the perimeter. Four corner posts 20 extend vertically upward from the four corners of the rectangular perimeter such that each of the crossbars and rails is connected between a respective pair of the corner posts 20.

The rails 16 are parallel and spaced apart to extend in the longitudinal direction of the frame. At the forward end of each of the rails there is provided a curved portion 22 in which the end of the rail is curved upwardly and forwardly so that the rails function as skids arranged for sliding movement along the ground in the longitudinal direction.

The two crossbars 18 are connected between the respective posts 20 at a location spaced upwardly from the rails by a distance of approximately four inches. In this manner the base 14 is open at opposing ends of the frame below the crossbars 18 in which the opening defined at the opposing ends is connected to and open with a bottom end of the base between the rails 16 along the full length of the frame.

Each of the four sides of the rectangular base further comprises a top bar 24 extending horizontally between the respective corners posts in which all of the top bars 24 lie at a common height spaced above the bottom end of the frame by a distance of approximately 24 inches. Suitable paneling extends downward from each top bar 24 towards the respective rail or crossbar so as to define a bunk wall 26 extending upwardly from the base about the full perimeter thereof in which the bunk wall is substantially vertical in orientation between a top end defined by the top bars 24 and a bottom end defined by the rails 16 at the long sides and by the crossbars 18 at the short sides of the base. The bunk wall 26 fully surrounds a central bunk area which is open through the bottom end of the base between the rails along the full length of the feeder.

A hopper 28 is supported by the posts at a location spaced above the bunk area. The hopper 28 is formed by a top bar 30 extending horizontally between top ends of the two corner posts along each of the four sides of the rectangular perimeter of the base. The top bars 30 lie in a common horizontal plane to define a top end of the hopper. A corner member 32 extends downwardly and inwardly from the top end of each of the corners posts 20 at an intersection of two top bars 30 therewith from the top end of the hopper to a bottom end of the hopper which is positioned spaced upwardly and inwardly from a top end of the bunk wall.

A bottom bar 34 is connected horizontally between the bottom ends of two of the corner members 32 along each of the four sides of the rectangular perimeter of the base so that each bottom bar 34 is spaced downwardly and inwardly from a corresponding one of the top bars 30 of the perimeter. The bottom bars 34 lie in a common horizontal plane defining a minimum cross-sectional dimension between opposing long sides and between opposing short sides of the hopper. Suitable paneling spans between the top bar and the corresponding bottom bar along each of the four sides to define a hopper wall which extends fully about the perimeter of the base to surround a central hopper area above the bunk area therebelow. Each of the four sides of the hopper thus extends upwardly and inwardly from the bottom end of the hopper defined by the bottom bars to the top end of the hopper defined by the top bars. The top bars 30 are in vertical alignment with respective ones of the four sides of the bunk wall about the rectangular perimeter of the base.

To optimally position a large bale centrally within the feeder for feeding by livestock with minimal waste, the bottom bars 34 defining the bottom end of the hopper are typically each spaced horizontally inward by a distance of approximately 15 inches from the top end of the corresponding bunk wall which is along the same side of the rectangular perimeter of the base. Furthermore the bottom end of the hopper is spaced above the bottom end of the frame by a distance of approximately 39 inches so as to be spaced vertically above the top end of the bunk wall by approximately 14 inches. The minimum cross-sectional dimension at the bottom end of the hopper between the two opposed long sides of the rectangular perimeter is approximately 72 inches to centrally locate a bale within the bunk area when it is inserted downwardly into the feeder through the open top end of the hopper. The cross-sectional dimension between the two opposed short sides of the base at the bottom end of the hopper corresponds to an even multiple of the lateral dimension between the opposed long sides at the bottom of the hopper. In preferred embodiments the dimension between the opposed bottom bars 34 at the short sides of the frame correspond to twice or three times the diameter of a bale to receive an even number of bales in series between the opposing ends of the frame.

A plurality of support members 36 are joined between the bottom end of the hopper wall and the top end of the bunk wall at horizontally spaced positions along each of the long sides and each of the short sides of the rectangular base so as to be spaced apart about a full perimeter of the frame. Each adjacent pair of support members 36 defines a respective feeding station arranged to receive one animal therebetween with sufficient space in a horizontal direction to receive the head of the animal reaching into the feeder. Distance between the bottom of the hopper and the top of the bunk wall is also sufficient to readily permit the head of the livestock animals to be received therethrough such that the livestock animals can reach readily over the bunk wall and under the hopper wall to feed from a central area of the feeder.

Each support member comprises a first portion 38 extending generally inward from the top edge of the bunk wall in which at least part of the first potion projects downwardly below the top end of the bunk wall between the bunk wall and an inner end of the first portion spaced inwardly therefrom. A second potion 40 of each support member extends upwardly from the inner end of the first portion generally towards the bottom end of the corresponding portion of the hopper thereabove.

Part of the second portion between the hopper at the top end and the bottom end connected to the first portion is arranged to project inwardly beyond the bottom edge of the hopper. In the illustrated embodiment the first and second portions are each support member are formed integrally with one another as continuous curved member having a concave upper and outer side and a convex inner and downward side.

Due to the inward curving second portion 40, the second portions at the two opposed sides of the perimeter of the base are nearer to one another than the minimum cross-sectional dimension of the hopper so as to have a distance therebetween which is near 66 inches so as to be less than the dimensions of the bale. When a bale is inserted into the hopper therefore, the support members serve to ensure the bale is centered between the two opposed long sides of the perimeter with the support members being arranged to project inwardly into the bale received therebetween under compression. The narrow dimensions of the support members allow the support member to readily penetrate into a bale received between opposing sides of the hopper as the bale is inserted through the hopper to the bunk area.

The downward projection of the first portions of the support members has the benefit of limiting the side to side sweeping movement of the neck of a livestock animal whose head is inserted between two support members. In this arrangement the side to side movement of the livestock animal is somewhat restricted to cause the livestock animal to feed primarily from a small feeding area directly in front of them as opposed to spreading feed material over a larger area which can cause more waste feed to be left on the ground.

In use, the feeder is typically towed by a suitable tractor to a desirable feeding location for livestock two or three bales are then inserted in series with one another through the open top end of the hopper such that the hopper receives the bales and centers the bales for passage through the bottom end of the hopper to be deposited at a central location on the ground spanning upwardly from the bunk area through to the hopper area with the full height of the bale being sheltered below the height of the hopper to prevent wind erosion of the bale. Animals can reach the bales from all four sides of the rectangular perimeter of the base. The positioning of the bottom end of the hopper relative to the top end of the bunk all provides optimal access for the animals to reach feed toward the center of the bunk area while the supports 36 limit side to side movement of the livestock to encourage the livestock to eat the feed material directly in front of them towards the center of the feeder. In this manner waste of feed material spread on the ground is minimized. When it is desirable to relocate the feeder to another location, a tractor can tow the feeder with the rails acting as skids supported for sliding along the ground. The opening below each of the portions of the bunk wall at opposing short sides of the rectangular base of the frame ensures that no debris on the ground tends to gather in front of the bunk walls as the feeder is displaced along the ground.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A livestock feeder in combination with a large bale, the feeder comprising:
   a base arranged to be supported on the ground;
   a bunk wall extending upwardly from the base about a perimeter of the base from a bottom end to a top end thereof so as to surround a lower bunk area, the bunk wall being defined by panel material spanning downwardly from the top end towards the bottom end of the bunk wall;
   a hopper wall extending about a perimeter of the base spaced above the bunk wall to surround an upper hopper area above the lower bunk area, the hopper wall extending upwardly at an outward inclination from a bottom end to a top end thereof and the hopper wall being defined by panel material spanning between the top end and the bottom end about the perimeter of the base; and
   a plurality of support members spanning between the hopper wall and the bunk wall at horizontally spaced positions along the walls;
   the bottom end of the hopper wall being spaced upwardly and inwardly in relation to the top end of the bunk wall therebelow about the perimeter of the base;
   the bottom end of the hopper wall defining a minimum cross sectional dimension of the hopper area which is at least 72 inches;
   each of the support members comprising a first portion extending generally inwardly from the top end of the bunk wall and a second portion extending generally upwardly from the first portion to the bottom end of the hopper wall;
   the second portions of the support members extending inwardly beyond the bottom end of the hopper wall such that a horizontal distance between the second portions of the support members at a pair of opposing sides of the base is arranged to be less than the large bale while receiving the large bale therethrough from the upper hopper area to the lower bunk area therebelow.

2. The feeder according to claim 1 wherein the top end of the hopper wall is spaced above the base so as to be arranged to be near in height to or greater in height than the large bale.

3. The feeder according to claim 1 wherein the bottom end of the hopper wall is spaced from the top end of the bunk wall so as to be arranged to receive a head of a livestock animal therethrough.

4. The feeder according to claim 1 wherein the bottom end of the hopper wall is spaced inwardly from the top end of the bunk wall by a horizontal distance comprising 12 to 18 inches.

5. The feeder according to claim 4 wherein the horizontal distance is approximately 15 inches.

6. The feeder according to claim 1 wherein the bottom end of the hopper wall is spaced inwardly from the top end of the bunk wall by a horizontal distance which is approximately equal to a vertical distance between the bottom end of the hopper wall and the top end of the bunk wall.

7. The feeder according to claim 1 wherein the bottom end of the hopper wall is approximately 36 to 40 inches in height.

8. The feeder according to claim 1 wherein the top end of the bunk wall is approximately 22 to 26 inches in height.

9. The feeder according to claim 1 wherein the bottom end of the hopper wall is spaced upwardly from the top end of the bunk wall by a vertical distance comprising 12 to 16 inches.

10. The feeder according to claim 1 wherein the top end of the hopper wall is in vertical alignment with the top end of the bunk wall.

11. The feeder according to claim 1 wherein the perimeter of the base is rectangular in shape comprising two opposed long sides and two opposed short sides; the cross sectional dimension of the hopper area at the bottom end of the hopper wall between the two opposed long sides is arranged to be approximately equal to a cross section dimension of the large bale; and the cross sectional dimension of the hopper area at the bottom end of the hopper wall between the two opposed short sides is arranged to be approximately equal to a cross section dimension of a plurality of large bales in series with one another.

12. The feeder according to claim 1 wherein there is provided a plurality of posts extending upwardly from the base to the top end of the hopper wall, the hopper wall and the bunk wall being supported on the posts.

13. The feeder according to claim 1 wherein the support members are connected between the top end of the bunk wall and the bottom end of the hopper wall and wherein the support members are spaced apart so as to be arranged to receive a head of a livestock animal therebetween.

14. The feeder according to claim 1 wherein the perimeter of the base is rectangular in shape comprising two opposed long sides and two opposed short sides and wherein the support members are joined between the bottom end of the hopper wall and the top end of the bunk wall at spaced apart positions along each of the long sides and each of the short sides.

15. The feeder according to claim 1 wherein the base is rectangular in shape comprising two opposed long sides and two opposed short sides and wherein the base comprises two elongate rails extending along the long sides, the bunk area being open to the ground between the two elongate rails of the base.

16. The feeder according to claim 15 wherein the bottom end of the bunk walls at the short sides of the base are spaced upwardly from the two elongate rails to define an opening therebelow.

* * * * *